(12) United States Patent
Leimann

(10) Patent No.: US 7,429,135 B2
(45) Date of Patent: Sep. 30, 2008

(54) ROLLER BEARING ASSEMBLY

(75) Inventor: Dirk-Olaf Leimann, Edegem (BE)

(73) Assignee: Hansen Transmissions International NV, Antwerp (BE)

( * ) Notice: Subject to any disclaimer, the term of this patent is extended or adjusted under 35 U.S.C. 154(b) by 531 days.

(21) Appl. No.: 10/473,223

(22) PCT Filed: Mar. 25, 2002

(86) PCT No.: PCT/IB02/02129

§ 371 (c)(1),
(2), (4) Date: Mar. 5, 2004

(87) PCT Pub. No.: WO02/077474

PCT Pub. Date: Oct. 3, 2002

(65) Prior Publication Data

US 2004/0136633 A1 Jul. 15, 2004

(30) Foreign Application Priority Data

Mar. 27, 2001 (GB) .................................. 0107615.7

(51) Int. Cl.
*F16C 27/04* (2006.01)
*F16C 43/04* (2006.01)

(52) U.S. Cl. ...................................... 384/581; 384/584

(58) Field of Classification Search ................. 384/581, 384/526, 537, 538, 539, 540, 541, 584
See application file for complete search history.

(56) References Cited

U.S. PATENT DOCUMENTS

| 1,286,438 | A | * | 12/1918 | Smith ......................... 384/570 |
| 4,042,283 | A | * | 8/1977 | Cain et al. ................... 384/584 |
| 4,509,804 | A | | 4/1985 | Klusman |
| 5,567,060 | A | | 10/1996 | Steinberger et al. |
| 5,853,260 | A | | 12/1998 | Curbillon et al. |

* cited by examiner

*Primary Examiner*—Marcus Charles
(74) *Attorney, Agent, or Firm*—Young & Thompson

(57) ABSTRACT

The invention relates to a roller bearing and seeks to reduce or mitigate the high edge stresses experienced by the bearing elements due to shaft misalignment or distortion under load. The invention provides a roller bearing assembly comprising an outer ring supported in a tubular housing formation associated with a wall of housing, the tubular housing formation extending for at least the axial length of the outer ring wherein the tubular housing formation provides a resistance to radial movement of the outer ring which is greater at one axial end of the outer ring than the other axial end. The low ring of resistance to radial movement may be by selectively profiling the tubular housing formation or rendering it circumferentially discontinuous.

20 Claims, 5 Drawing Sheets

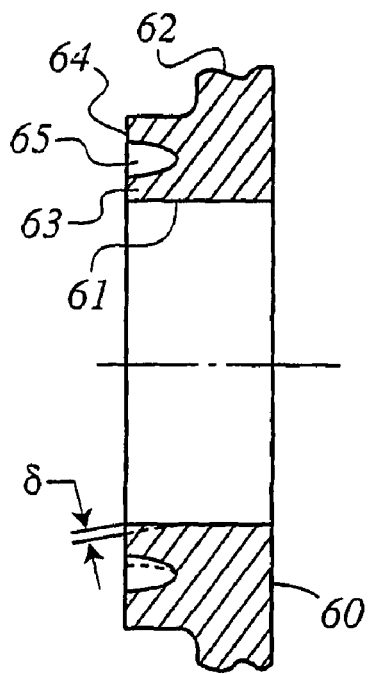
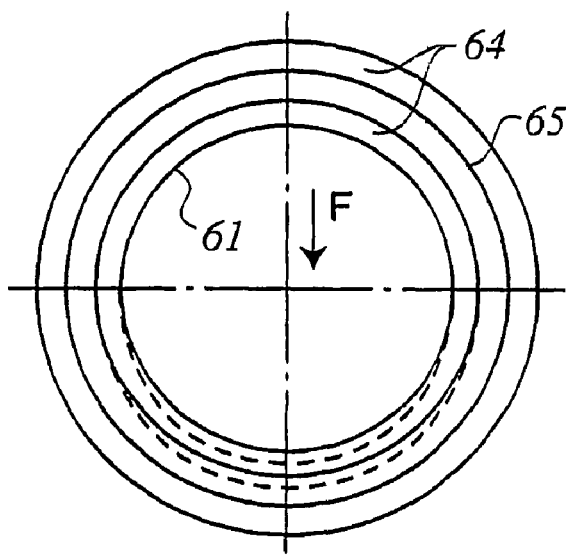
FIG. 6a  FIG. 6b
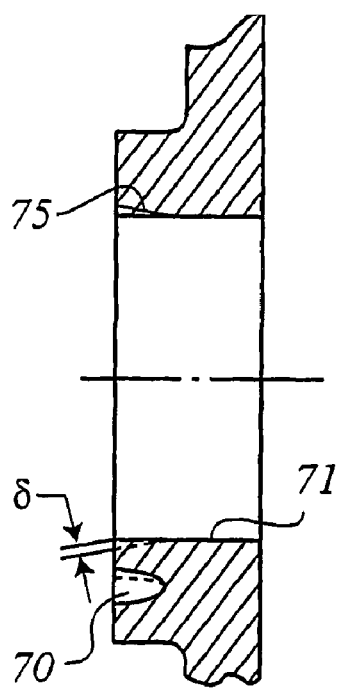
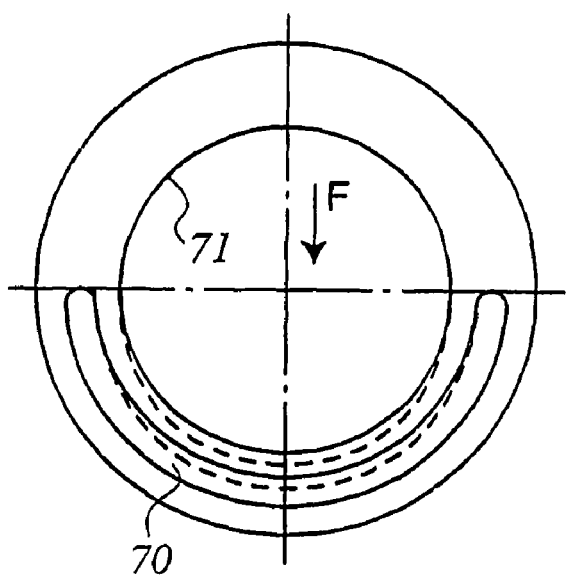
FIG. 7a  FIG. 7b

ROLLER BEARING ASSEMBLY

BACKGROUND OF THE INVENTION

This invention relates to a roller bearing assembly and in particular, though not exclusively, to a gear unit comprising a housing and gear shafts rotatably supported relative to the housing by means of taper or cylindrical roller bearings.

DESCRIPTION OF THE RELATED ART

In accordance with the recommendations of bearing manufacturers it is conventional to provide a shrink type fit between the inner ring, (cone), of a taper roller bearing and the surface of a gear shaft. The shrink fit is necessary in order to avoid or minimise the risk of fretting corrosion and other damage.

In contrast to the shrink fit requirement for the inner ring, the outer ring of a roller bearing of the taper type does not need to be a tight fit in the housing because of the point type loading experienced by the outer ring.

Whilst a shrink fit is not required between the outer ring of each bearing and the housing wall, the housing wall nevertheless requires to be sufficiently stiff in order that the bearing is properly located axially and in order that required preload or clearance is maintained despite axial forces arising in consequence of any helical gear carried by a shaft and which would tend to distort a housing wall.

The operating life of bearings of both the taper and cylindrical roller types is dependent also on the degree of misalignment which might arise in use between the rotational axis of the shaft to which the inner bearing ring is secured, and the location of the outer bearing ring. Particularly in the case of those gear stages of a multistage gear box that are subject to higher loads, the shaft misalignment can be significant and the consequential high edge stresses experienced by the bearing can result in an undesirable reduction in the satisfactory working life of the bearing.

SUMMARY OF THE INVENTION

The present invention seeks to provide a roller bearing assembly in which the aforedescribed difficulties are mitigated or overcome.

In accordance with one aspect of the present invention there is provided a roller bearing assembly wherein the outer ring of the bearing is supported in a tubular housing formation associated with the wall of a housing and extending axially for at least the axial length of the outer ring as considered in an axial direction substantially coincident with the rotational axis of the bearing, said housing formation providing a resistance to radial movement of outer ring which is greater at one axial end of the outer ring then at the other axial end of the outer ring.

The housing formation may extend to a position displaced substantially to one side of a plane containing the surrounding housing wall in the vicinity of the bearing thereby to provide the resistance to movement in the radial direction.

Additionally or alternatively the difference in resistance to radial movement may be attained by selective profiling of the housing wall and/or the housing formation so that the housing wall presents a greater resistance to deformation under the action of forces acting parallel with the plane of the wall at one axial end of the bearing outer ring than at the other end.

A tubular housing formation may extend from the general plane of the housing wall in an inwards direction. i.e. in a direction facing towards an opposite wall of housing. Alternatively the tubular housing formation may extend outwards, with a conventional bearing cover cap being secured to the distal end of the tubular housing formation or, alternatively, to the surrounding wall of the housing.

A tubular housing formation may be provided with a radially inwardly extending abutment flange to assist in providing location for the outer ring of a roller bearing.

The wall thickness and construction of a tubular housing formation preferably assist in allowing the tubular housing formation to deform under load in a manner which tends to follow distortion of the shaft when operating under load. In consequence the effect of misalignment between the inner and outer bearing rings is reduced and there is a corresponding reduction in potentially damaging edge stresses experienced by the bearing rollers.

To assist in providing a tubular housing formation with an ability to deform in substantial conformity with deformation of the shaft, the tubular housing formation may be circumferentially discontinuous at least over a part of the axial length thereof. The tubular housing formation may, for example, be provided with at least one slit in the wall thereof extending longitudinally and substantially parallel with the major axis of the housing formation or helically relative thereto.

A tubular housing formation may be formed integrally as a part of a housing wall, e.g. by casting, or it may be defined by a component which is preformed and then secured to a housing wall, e.g. by clamping or welding.

Irrespective of whether or not the assembly comprises a tubular housing formation of a type that is displaced substantially to one side of a plane containing the surrounding housing wall, the material of the housing wall (or a tubular housing formation) may be selectively profiled at either a face which is an inner face in an assembled gear unit or an external face.

The selective profiling may comprise a groove formation in the housing, or it may comprise a rebate region (which term is used to mean also a chamfer region) of the housing formation such that a radial clearance is provided between the housing formation and bearing ring over a part of the axial length of the outer ring.

A groove formation or rebate may be circumferentially continuous. However, if operating load conditions are predictable and of specific directions the groove formation or rebate may be circumferentially discontinuous, e.g. substantially semi-circular, and selectively positioned in the housing having regard to the direction of operating loads.

Considered in cross-sections of the housing wall, a groove may for example be of or comprise a substantially rectangular, triangular, parabolic or semi-circular shape.

A groove, or a rebate region, if provided, preferably extends axially for between 10% and 75%, more preferably between 15% and 50% of the axial length of the outer ring.

In the case of roller bearings of the tapered type, a pair of taper roller bearings provided on a shaft may be arranged in X configuration in which the rollers each decrease in diameter in a direction away from the other bearing of a pair, or an O configuration in which said diameters increase in a direction away from the other bearing of each pair.

BRIEF DESCRIPTION OF THE DRAWING

Embodiments of the present invention will now be described, by way of example only, with reference to the accompanying diagrammatic drawings in which:

FIG. 6 shows a section and side view of part of a further housing in accordance with the present invention, and FIG. 7 shows views similar to those in FIG. 6 of a yet further embodiment.

DESCRIPTION OF THE PREFERRED EMBODIMENTS

Figure 1:
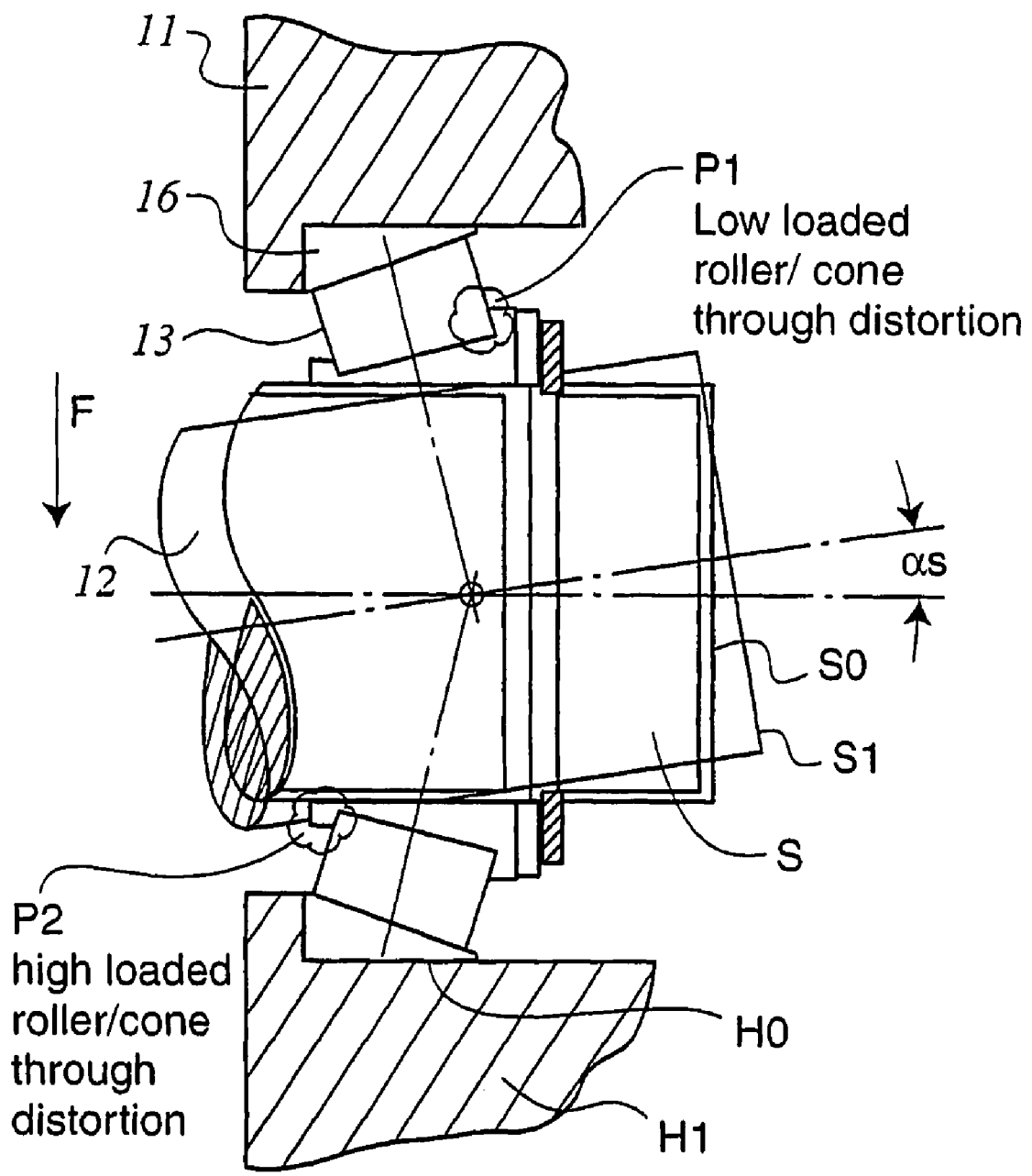
FIG. 1 is a sectional view of part of a known gear unit assembly.

A conventional gear unit assembly (see FIG. 1) comprises a housing wall 11, and a shaft 12 rotatably supported in the housing wall by means of a taper roller bearing 13. The taper roller bearing lies axially relative to the shaft at a position aligned with a general plane containing the wall of the housing in the vicinity of the shaft such that radial loads are transmitted directly to the wall of the housing with minimum distortion effects.

Because of the firm location of the bearing outer ring 16, the axial ends of the bearing rollers are subject to high edge stresses, In consequence there results a reduction in the useful working life of the bearing.

Figure 2:
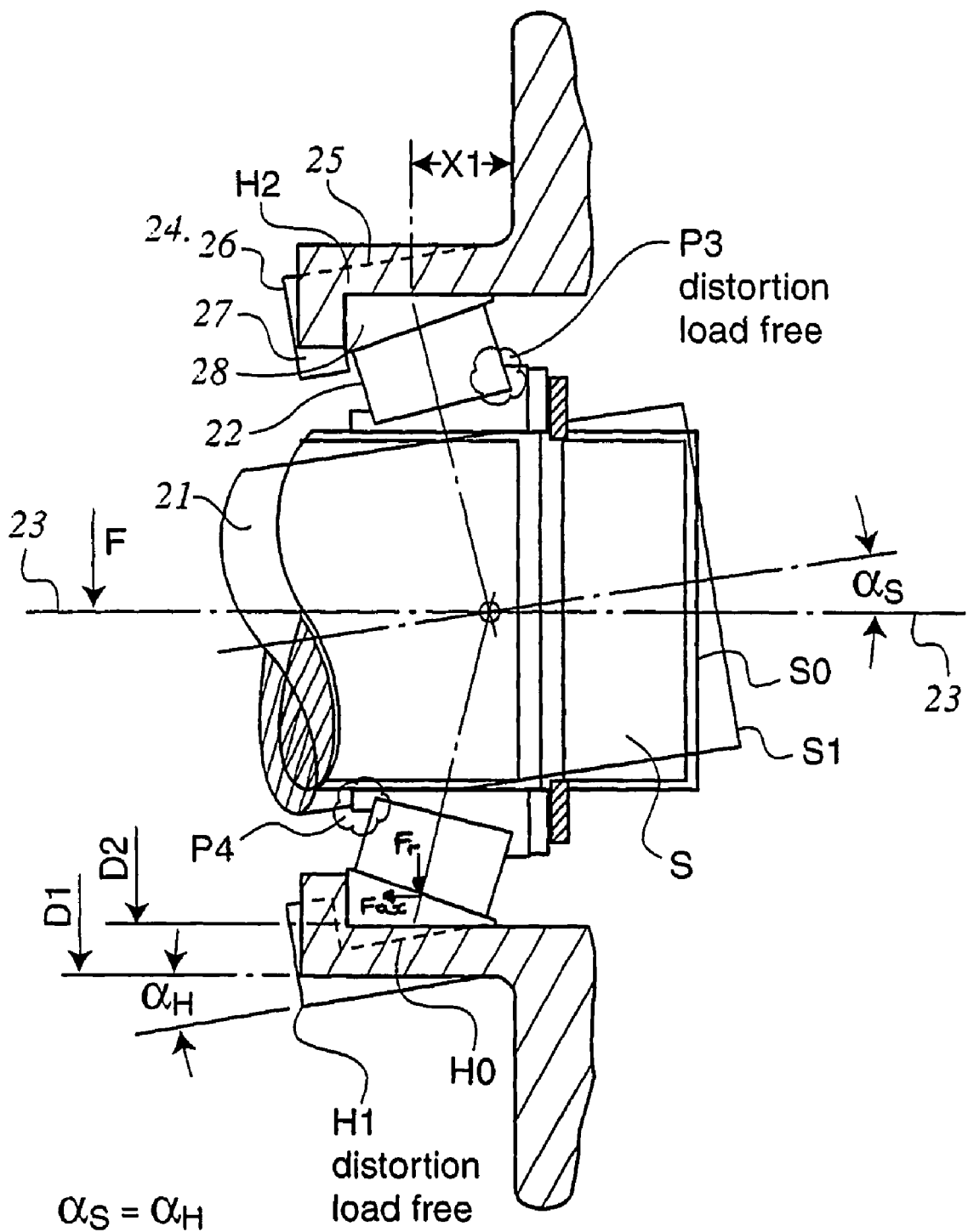
FIG. 2 is a sectional view of part of a gear unit assembly in accordance with the present invention.

FIG. 2 illustrates a gear unit assembly 20 in accordance with the present invention in which a shaft 21 is rotatably supported in a taper roller bearing 22 at a position, relative to the major axis 23 of the shaft, which is axially displaced from the wall of the housing in the vicinity of the shaft. The taper roller bearing is supported in a tubular housing formation defined by a tubular housing sleeve 25 that extends axially inwards to within the chamber 24 of the gear unit housing. The axially inner end 26 of the housing sleeve is formed with a radially inwardly extending abutment flange 27 which provides axial location for the outer ring 28 of the taper roller bearing which is mounted in an O configuration in conjunction with the taper roller bearing provided at the other end of the shaft 21.

Figure 3:
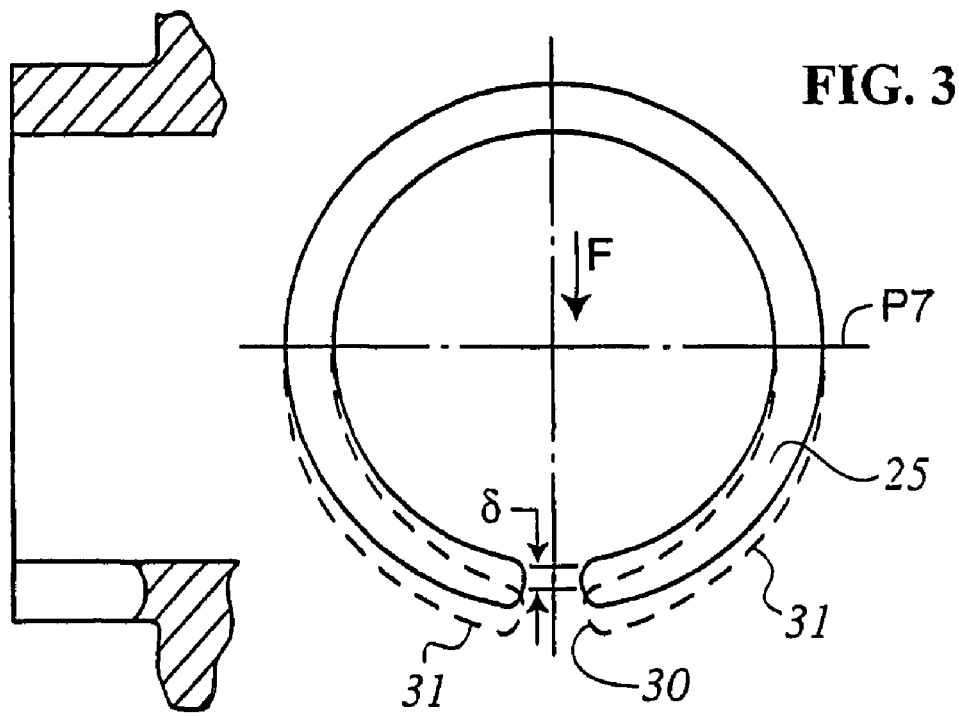
FIG. 3 shows a part longitudinal section view and an end view of a modified form a part of the FIG. 2 embodiment.
Figure 4:
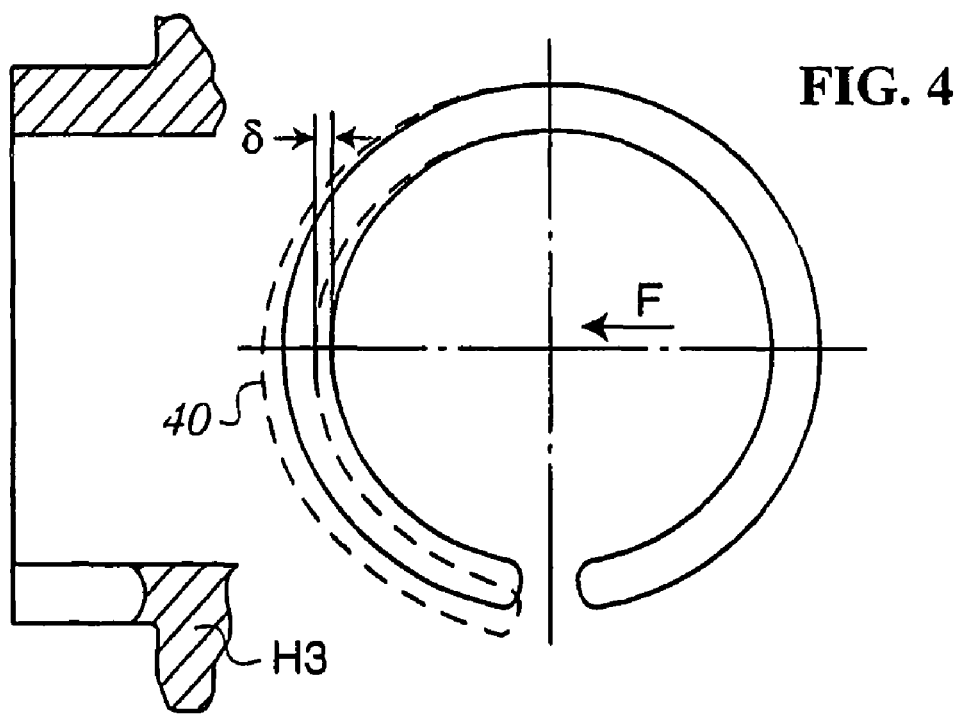
FIG. 4 shows the views of FIG. 3 in another load condition.

The tubular housing sleeve 25 need not be circumferentially continuous, but may comprise an axially extending slot 30 as shown in longitudinal section and end view in FIG. 3. FIG. 3 shows in dotted line 31, in the end direction, the shape adopted by the tubular housing formation 25 when subject to a vertically downwards load F in consequence of a gear unit shaft experiencing loads that cause it to deflect downwards at a position between ends of the shaft. Similarly, when subject to a sideways loading as shown in FIG. 4, the housing sleeve is also able to deflect to the dotted line position 40 and facilitate a reduction in the localised edge stresses that would otherwise be experienced by the bearing rollers.

Figure 5:
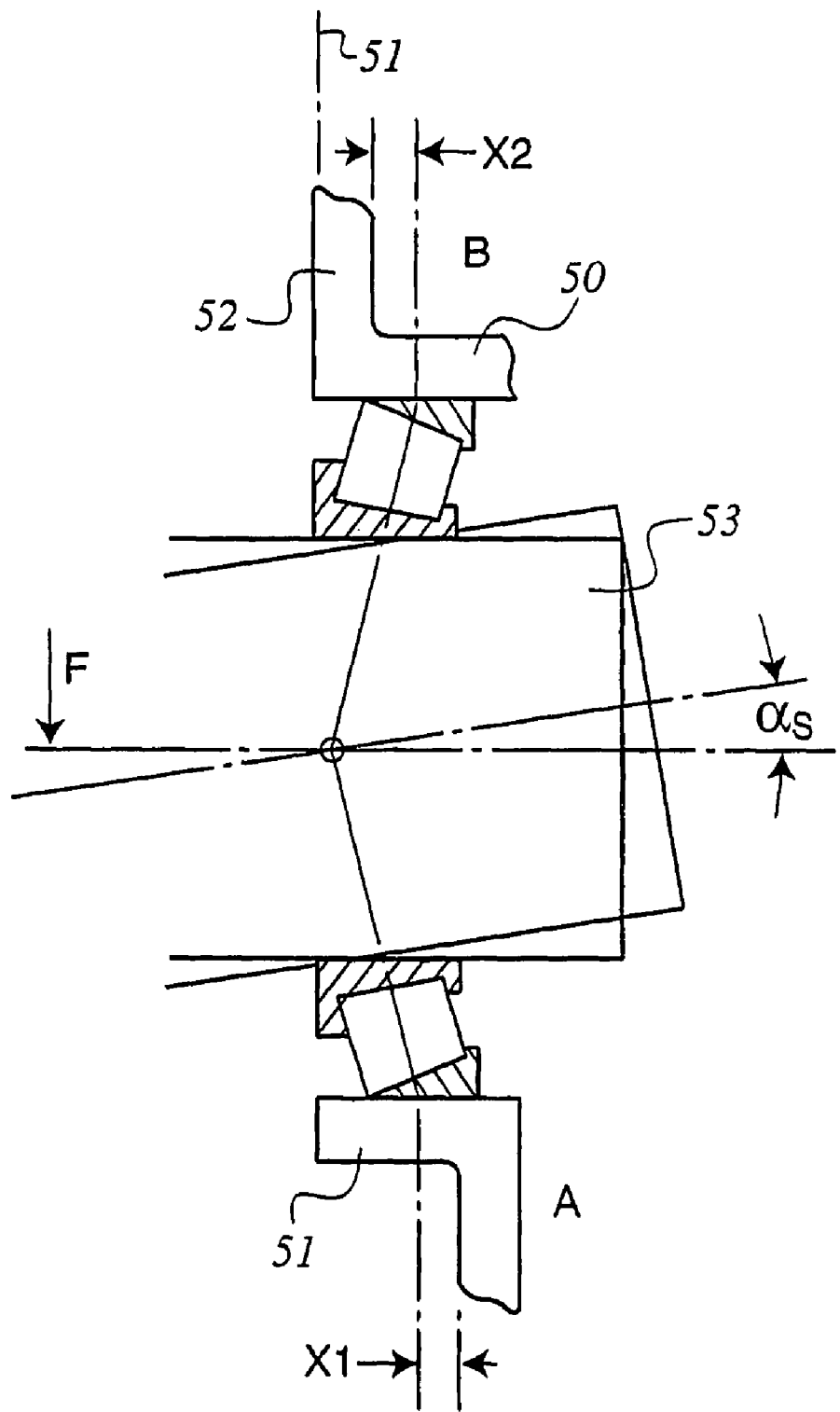
FIG. 5 shows a vertical section of parts of two other gear unit assemblies in accordance with the present invention.

In a further embodiment shown in the upper half of FIG. 5 a tubular housing formation 50 extends outwards from the gear unit housing, to support a taper roller bearing, in this case one arranged in an X configuration, at a position outwards of the plane 51 defined by the housing wall 52 in the vicinity of the shaft 53.

In the lower half of FIG. 5 the distance ×1 between the line of action of the bearing of an X arrangement is less than the corresponding distance of the O configuration of FIG. 2. In consequence the potential for distortion of the inwardly extending housing sleeve 51 is less. In contrast, if an X configuration bearing is mounted in an outwardly extending housing sleeve 50 as shown in the upper half of FIG. 5 the distance×2 is greater and the sleeve is more easily deformed.

FIG. 6a shows in section a part of a gear unit housing wall 60 having a housing aperture formation 61 in which the outer ring of a roller bearing (not shown) can be located. The formation 61 has an axial length corresponding to the thickness of the wall 60 in the vicinity 62 of the aperture 61 and the thickness of an annular shoulder 63 formed integrally with the material of the wall 60.

The axial end face 64 of the shoulder 63 is formed with a circumferentially extending groove 65 (see FIG. 6b) which, in this embodiment, has a depth slightly less than the thickness of the shoulder 63. The aperture 61 is intended to receive a bearing outer ring which has an axial length substantially equal to the axial length of the aperture, and said groove has a depth of 35% of that axial length of the bearing.

FIG. 7 shows views 7a and 7b which correspond substantially with those of FIGS. 6a and 6b except that in this embodiment a groove 70 is circumferentially discontinuous, and more specifically is of semi-circular shape about the axis of aperture 71.

In each of FIGS. 6 and 7 the broken lines and the angle delta indicate the manner in which the presence of the groove allows the material of the wall defining the aperture 61, 71 to deflect under local load.

FIG. 7a shows also the optional use of a rebate to facilitate differential radial stiffness. The chamfer line 75 shows a position to which the aperture 71 may be cut back (or initially formed) such that the housing aperture formation is part cylindrical and part frusto-conical in shape. In use with a conventional bearing outer ring of cylindrical outer shape the rebate region allows part of the axial length of the outer ring to deform more readily than that part contained within the length of the cylindrical section.

The present invention is suitable also for use in combination with a grooved type of roller bearing as described in the specification of our co-pending UK Patent Application No. GB 0107616.5.

The invention claimed is:

1. A roller bearing assembly comprising an outer ring supported in a tubular housing formation associated with the wall of a housing and extending for at least the axial length of the outer ring as considered in an axial direction substantially coincident with the rotational axis of the bearing, wherein said tubular housing formation provides a resistance to radial movement of the outer ring which is greater at one axial end of the outer ring than at the other axial end of the outer ring and said tubular housing formation is provided with selective profiling allowing the tubular housing formation vertical and sideways deflection in consequence of shaft loading.

2. A roller bearing assembly according to claim 1 wherein said selective profiling comprises at least one slit extending longitudinally with the major axis of the tubular housing formation, and the tubular housing formation extends to a position substantially displaced to one side of a plane containing the surrounding housing wall in the vicinity of the bearing.

3. A roller bearing assembly according to claim 1 wherein said selective profiling comprises at least one slit so that the tubular housing formation is circumferentially discontinuous at least over a part of the axial length thereof in the region of lesser radial resistance to movement.

4. A roller bearing assembly according to claim 1, wherein the tubular housing formation is provided with at least one slit in the wall thereof extending longitudinally and substantially parallel with the major axis of the tubular housing formation.

5. A roller bearing assembly according to claim 1, wherein the tubular housing assembly is provided with at least one slit in the wall thereof extending helically relative to the major axis of the tubular housing formation.

6. A bearing assembly according to claim 1, wherein the tubular housing formation is selectively profiled in the vicinity of a region of lesser radial resistance to movement.

7. A bearing assembly according to claim 6 wherein the selective profiling of the tubular housing formation comprises providing an annular groove in the tubular housing.

8. A bearing assembly according to claim 6 wherein the selective profiling of the tubular housing formation comprises providing a rebate or chamfer region such to provide a radial clearance between the housing formation and the outer ring over a part of the axial length of the outer ring.

9. A bearing assembly according to claim 6 wherein the selective profiling of the tubular housing formation is circumferentially continuous.

10. A bearing assembly according to claim 1, wherein the selective profiling of the tubular housing formation is circumferentially discontinuous.

11. A bearing assembly according to claim 10 wherein the selective profiling is substantially semi-circular and selectively positioned within the tubular housing formation having regard to the direction of operating loads.

12. A bearing assembly according to claim 1, wherein the region of selective profiling extends axially for between 10% and 75% of the axial length of the outer ring.

13. A bearing assembly according to claim 1, wherein the region of selective profiling extends axially for between 15% and 50% of the axial length of the outer ring.

14. A gear unit comprising a housing and gear shafts rotatably supported relative to the housing by means of taper or cylindrical roller bearings assemblies, the bearing assemblies being in accordance with claim 1.

15. A gear unit in accordance with claim 14 wherein the tubular housing formation formed integrally as part of a housing wall of the gear unit.

16. A gear unit according to claim 14 wherein the tubular housing formation defined by a component which is pre-formed and then secured to a housing wall of the gear unit.

17. A roller bearing assembly, comprising:
a housing with a housing wall;
a bearing rotation axis;
an outer ring having an axial length in an axial direction substantially coincident with the bearing rotational axis;
a tubular housing formation supporting the outer ring, the tubular housing formation associated with the housing wall and extending outward from the housing wall for at least the axial length of the outer ring,
wherein said tubular housing formation provides a resistance to radial movement of the outer ring which is greater at one axial end of the outer ring than at the other axial end of the outer ring, and
said tubular housing formation is provided with selective profiling to allow the tubular housing formation vertical and sideways deflection responsive to shaft loading (F).

18. The assembly of claim 17, wherein the selective profiling comprises a slit extending longitudinally and parallel with the major axis of the tubular housing formation.

19. A roller bearing assembly, comprising:
a tubular housing formation with a tubular housing sleeve (25) extending from a housing wall;
a taper roller bearing (22) within the tubular housing sleeve; and
a shaft (21) having a major axis (23), the shaft rotatably supported in the taper roller;
a outer ring (28) bearing against the shaft and inside the tubular housing sleeve; and
an extending slit (30) within the tubular housing sleeve (25), the slit extending longitudinally with the major axis, the tubular housing sleeve vertically and sideways deflectable in consequence of shaft loading (F).

20. The assembly of claim 19, wherein the slit extends longitudinally and substantially parallel with the major axis of the tubular housing formation.

* * * * *